United States Patent
Keating et al.

(10) Patent No.: US 12,481,020 B2
(45) Date of Patent: Nov. 25, 2025

(54) METHOD AND APPARATUS FOR POSITIONING REFERENCE SIGNAL TRANSMISSION AND RECEPTION

(71) Applicant: Nokia Solutions and Networks Oy, Espoo (FI)

(72) Inventors: Ryan Keating, Chicago, IL (US); Johannes Harrebek, Aalborg (DK); Tao Tao, Shanghai (CN); Daejung Yoon, Massy (FR); Kyoungmin Park, Gyeonggi (KR)

(73) Assignee: Nokia Solutions and Networks Oy, Espoo (FI)

( * ) Notice: Subject to any disclaimer, the term of this patent is extended or adjusted under 35 U.S.C. 154(b) by 316 days.

(21) Appl. No.: 18/246,976

(22) PCT Filed: Oct. 9, 2020

(86) PCT No.: PCT/CN2020/119883
§ 371 (c)(1),
(2) Date: Mar. 28, 2023

(87) PCT Pub. No.: WO2022/073171
PCT Pub. Date: Apr. 14, 2022

(65) Prior Publication Data
US 2023/0366977 A1 Nov. 16, 2023

(51) Int. Cl.
*G01S 5/10* (2006.01)
*G01S 5/00* (2006.01)
*G01S 5/02* (2010.01)

(52) U.S. Cl.
CPC .............. *G01S 5/10* (2013.01); *G01S 5/0036* (2013.01); *G01S 5/021* (2013.01); *G01S 5/0226* (2013.01)

(58) Field of Classification Search
CPC .......... G01S 5/10; G01S 5/0036; G01S 5/021; G01S 5/0226
(Continued)

(56) References Cited

U.S. PATENT DOCUMENTS 10,469,217 B2 * 11/2019 Opshaug ............. H04W 72/044
10,616,858 B2   4/2020 Agnihotri et al.
(Continued)

FOREIGN PATENT DOCUMENTS

CN 106664591 A 5/2017
CN 107797090 A 3/2018
(Continued)

OTHER PUBLICATIONS

"3rd Generation Partnership Project; Technical Specification Group Radio Access Network; NR; Physical layer procedures for data (Release 16)", 3GPP TS 38.214, V16.2.0, Jun. 2020, pp. 1-163.
(Continued)

*Primary Examiner* — Harry K Liu
(74) *Attorney, Agent, or Firm* — Nokia Solutions and Networks Oy

(57) ABSTRACT

Disclosed are embodiments of methods and apparatuses for positioning user equipment (UE). A method for positioning UE may comprise calculating expected receiving time differences between respective expected times for the UE to receive positioning reference signals (PRSs) from a plurality of neighbor base stations respectively and an expected time for the UE to receive a PRS from a reference base station, determining a PRS timing offset to at least partially compensate for the expected receiving time difference of at least one of the plurality of neighbor base stations, and sending the PRS timing offset to the at least one of the plurality of neighbor base stations.

15 Claims, 10 Drawing Sheets

(58) Field of Classification Search
USPC .......................................................... 342/386
See application file for complete search history.

(56) References Cited

U.S. PATENT DOCUMENTS

| | | |
|---|---|---|
| 2015/0018010 A1 | 1/2015 | Fischer |
| 2016/0065342 A1 | 3/2016 | Mirbagheri et al. |
| 2016/0295374 A1 | 10/2016 | Persson et al. |
| 2019/0101615 A1 | 4/2019 | Tenny |
| 2019/0387491 A1 | 12/2019 | Han et al. |
| 2020/0077225 A1 | 3/2020 | Kumar et al. |
| 2020/0145955 A1 | 5/2020 | Opshaug et al. |
| 2020/0228381 A1 | 7/2020 | Manolakos et al. |
| 2022/0393736 A1* | 12/2022 | Park ..................... H04B 7/0634 |

FOREIGN PATENT DOCUMENTS

| | | | | |
|---|---|---|---|---|
| CN | 109479278 A | * | 3/2019 | ........... G01S 1/0428 |
| CN | 109565780 A | | 4/2019 | |
| CN | 109964142 A | | 7/2019 | |
| CN | 111726857 A | | 9/2020 | |
| EP | 3952438 A1 | * | 2/2022 | ............. G01S 5/021 |
| JP | 7018430 B2 | * | 2/2022 | ............. G01S 5/0036 |
| WO | 2020/035153 A1 | | 2/2020 | |

OTHER PUBLICATIONS

"New WID: NR Positioning Support", 3GPP TSG RAN Meeting #83, RP-190752, Agenda: 9.1.1, Intel Corporation, Mar. 18-21, 2019, 2019, 6 pages.

"Introduction of NR positioning support", 3GPP TSG-RAN WG1 Meeting #99, R1-1913661, Ericsson, Nov. 18-22, 2019, 2019, 11 pages.

"New SID on NR Positioning Enhancements", 3GPP TSG RAN Meeting #86, RP-193237, Agenda: 9.1.1, Qualcomm Incorporated, Dec. 9-12, 2019, 2019, 4 pages.

"New SID: Study on supporting NR from 52.6GHz to 71 GHz", 3GPP TSG RAN Meeting #86, RP-193259, Agenda: 9.1.1, Intel Corporation, Dec. 9-12, 2019, 2019, 3 pages.

"Msc-generator", Sourceforge, Retrieved on Apr. 24, 2023, Webpage available at : https://sourceforge.net/projects/msc-generator/.

"3rd Generation Partnership Project; Technical Specification Group Radio Access Network; NG-RAN; NR Positioning Protocol A (NRPPa) (Release 16)", 3GPP TS 38.455, V16.0.0, Jul. 2020, pp. 1-60.

Wang et al., "An analytic solution for computing RSTD uncertainty in generating assistance data for OTDOA positioning", IEEE 28th Annual International Symposium on Personal, Indoor, and Mobile Radio Communications (PIMRC), Oct. 8-13, 2017, 8 pages.

International Search Report and Written Opinion received for corresponding Patent Cooperation Treaty Application No. PCT/CN2020/119883, dated Jul. 7, 2021, 9 pages.

"On providing timing information of an LTE cell to the LMF", 3GPP TSG-RAN WG2#103, R2-1812460, Agenda: 10.2.4, Ericsson, Aug. 20-24, 2018, 2019, pp. 1-3.

"Discussion on necessity and details for physical-layer procedures to support UE/gNB measurements", 3GPP TSG RAN WG1 #99, R1-1912275, Agenda: 7.2.10.4, LG Electronics, Nov. 18-22, 2019, 13 pages.

Office Action received for Chinese Patent Application No. 202080105985.8, dated Mar. 12, 2024, 14 pages of Office Action and no page of translation available.

"Further Discussion on NR PRS RSTD Requirements for UE", 3GPP TSG-RAN WG4 Meeting #94-e, R4-2000389, Agenda Item: 8.8.2.1.2, Intel Corporation, Feb. 24-Mar. 6, 2020, 16 pages.

\* cited by examiner

METHOD AND APPARATUS FOR POSITIONING REFERENCE SIGNAL TRANSMISSION AND RECEPTION

RELATED APPLICATION

This application was originally filed as PCT Application No. PCT/CN2020/119883, filed on Oct. 9, 2020, which is incorporated herein by reference in its entirety.

TECHNICAL FIELD

Various example embodiments described herein generally relate to method and apparatus for positioning reference signal transmission and reception.

BACKGROUND

Many terrestrial network-based positioning schemes have been proposed for position estimation of user equipment (UE) such as a mobile phone, an IoT device, or navigation or tracking equipment in a wireless communication network. The positioning schemes typically rely on timing-based techniques, angle-based techniques, or hybrid techniques in which both timing- and angle-based techniques are used.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a method for positioning a UE is provided. The method may comprise calculating, at a location server, expected receiving time differences between respective expected times for the UE to receive PRSs from a plurality of neighbor base stations respectively and an expected time for the UE to receive a PRS from a reference base station and determining a PRS timing offset to at least partially compensate for the expected receiving time difference of at least one of the plurality of neighbor base stations. The method may further comprise sending the PRS timing offset from the location server to the at least one of the plurality of neighbor base stations.

In a second aspect, an example embodiment of a method for positioning a UE is provided. The method may comprise receiving, at a base station from a location server, at least one PRS timing offset, applying the at least one PRS timing offset to adjust transmission timing of the PRS at the base station, and transmitting, from the base station, the PRS according to the adjusted transmission timing of the PRS.

In a third aspect, an example embodiment of a method for positioning a UE is provided. The method may comprise the UE receiving from a location server a PRS timing offset for at least one of a plurality of neighbor base stations and measuring PRSs received from a plurality of base stations comprising the plurality of neighbor base stations and a reference base station to determine receiving time differences of the PRSs between the respective neighbor base stations and the reference base station. The method may further comprise the UE correcting the measured receiving time difference of the at least one of the plurality of neighbor base stations at least based on the PRS timing offset.

In a fourth aspect, an example embodiment of a location server device is provided. The location server device may comprise at least one processor and at least one memory including computer program code. The at least one memory and the computer program code may be configured to, with the at least one processor, cause the location server device to perform actions. The actions may comprise calculating expected receiving time differences between respective expected times for the UE to receive PRSs from a plurality of neighbor base stations respectively and an expected time for the UE to receive a PRS from a reference base station, determining a PRS timing offset to at least partially compensate for the expected receiving time difference of at least one of the plurality of neighbor base stations, and sending the PRS timing offset to the at least one of the plurality of neighbor base stations.

In a fifth aspect, an example embodiment of a network device is provided. The network device may comprise at least one processor and at least one memory including computer program code. The at least one memory and the computer program code may be configured to, with the at least one processor, cause the network device to perform actions. The actions may comprise receiving from a location server at least one PRS timing offset, applying the at least one PRS timing offset to adjust transmission timing of the PRS, and transmitting the PRS according to the adjusted transmission timing of the PRS.

In a sixth aspect, an example embodiment of a terminal device is provided. The terminal device may comprise at least one processor and at least one memory including computer program code. The at least one memory and the computer program code may be configured to, with the at least one processor, cause the terminal device to perform actions. The actions may comprise receiving from a location server a PRS timing offset for at least one of a plurality of neighbor base stations, measuring PRSs received from a plurality of base stations comprising the plurality of neighbor base stations and a reference base station to determine receiving time differences of the PRSs between the respective neighbor base stations and the reference base station, and correcting the measured receiving time difference of the at least one of the plurality of neighbor base stations at least based on the PRS timing offset.

In a seventh aspect, an example embodiment of an apparatus for positioning a UE is provided. The apparatus may comprise means for calculating expected receiving time differences between respective expected times for the UE to receive PRSs from a plurality of neighbor base stations respectively and an expected time for the UE to receive a PRS from a reference base station, means for determining a PRS timing offset to at least partially compensate for the expected receiving time difference of at least one of the plurality of neighbor base stations, and means for sending the PRS timing offset to the at least one of the plurality of neighbor base stations.

In an eighth aspect, an example embodiment of an apparatus for positioning a UE is provided. The apparatus may comprise means for receiving from a location server at least one PRS timing offset, means for applying the at least one PRS timing offset to adjust transmission timing of the PRS, and means for transmitting the PRS according to the adjusted transmission timing of the PRS.

In a ninth aspect, an example embodiment of an apparatus for positioning a UE is provided. The apparatus may comprise means for receiving from a location server a PRS timing offset for at least one of a plurality of neighbor base stations, means for measuring PRSs received from a plurality of base stations comprising the plurality of neighbor base stations and a reference base station to determine receiving time differences of the PRSs between the respective neighbor base stations and the reference base station, and means for correcting the measured receiving time difference of the at least one of the plurality of neighbor base stations at least based on the PRS timing offset.

In a tenth aspect, an example embodiment of a computer readable medium is provided. The computer readable medium may have instructions stored thereon. The instructions, when executed by at least one processor of a location server device, may cause the location server device to perform a method provided in the above first aspect.

In an eleventh aspect, an example embodiment of a computer readable medium is provided. The computer readable medium may have instructions stored thereon. The instructions, when executed by at least one processor of a network device, may cause the network device to perform a method provided in the above second aspect.

In a twelfth aspect, an example embodiment of a computer readable medium is provided. The computer readable medium may have instructions stored thereon. The instructions, when executed by at least one processor of a terminal device, may cause the terminal device to perform a method provided in the above third aspect.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "network function (NF)" refers to a processing function in a network, and defines a functional behavior and an interface. The network function may be implemented by using dedicated hardware, or may be implemented by running software on dedicated hardware, or may be implemented on a form of a virtual function on a common hardware platform. From a perspective of implementation, network functions may be classified into a physical network function and a virtual network function. From a perspective of use, network functions may be classified into a dedicated network function and a shared network function.

As used herein, the term "terminal device" or "user equipment" (UE) refers to any entities or devices that can wirelessly communicate with the network devices or with each other. Examples of the terminal device can include a mobile phone, a mobile terminal (MT), a mobile station (MS), a subscriber station (SS), a portable subscriber station (PSS), an access terminal (AT), a computer, a wearable device, an on-vehicle communication device, a machine type communication (MTC) device, a D2D communication device, a V2X communication device, a sensor and the like. The term "terminal device" can be used interchangeably with a UE, a user terminal, a mobile terminal, a mobile station, or a wireless device.

Figure 1:
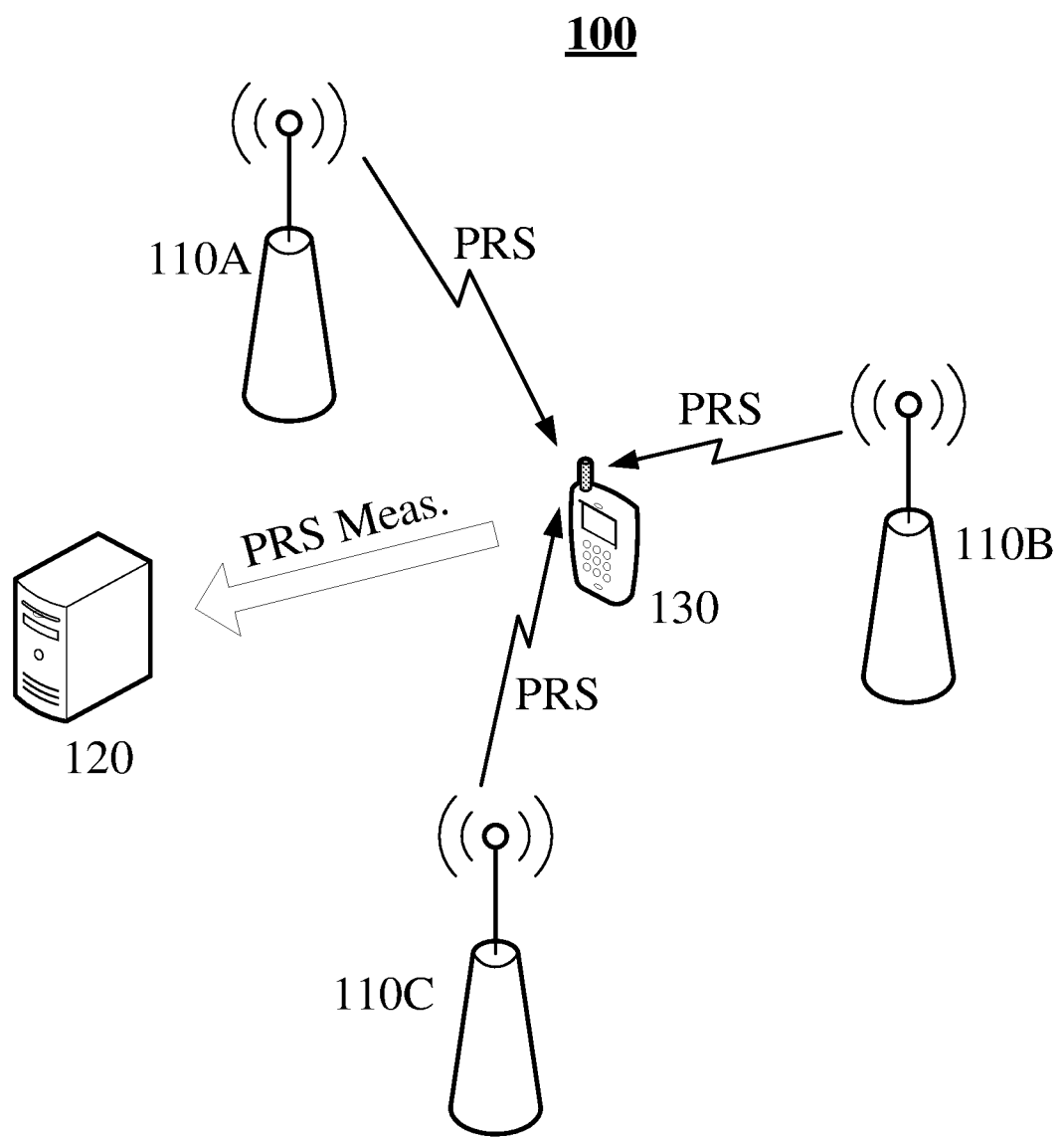
FIG. 1 shows a schematic diagram illustrating an example communication system in which embodiments of the present disclosure can be implemented.

FIG. 1 illustrates a simplified schematic diagram of an example communication network 100 in which embodiments of the present disclosure may be implemented. Referring to FIG. 1, the communication network 100 may include a plurality of base stations (BSs) 110A, 110B and 110C deployed around user equipment (UE) 130, which may be collectively referred to as the BSs 110. One of the BSs 110, for example the BS 110A, may establish RRC connection with the UE 130 and provide access for the UE 130 to the network 100. In such a case, the BS 110A may be treated as a reference BS, and the BSs 110B, 110C may be treated as neighbor BSs. It would be appreciated that the communication network 100 may include more BSs although three BSs are shown in FIG. 1.

When the OTDOA (also called as DL-TDOA) positioning method is applied, the UE 130 may receive positioning reference signals (PRSs) from the BSs 110 and measure the time of arrival (TOAs) of the PRSs. The TOAs of the PRSs from the neighbor BSs 110B, 110C may be subtracted from the TOA of the PRS from the reference BS 110A to obtain OTDOAs. The OTDOA measurement is also referred to as Reference Signal Time Difference (RSTD) measurement, and it can in principle be performed on any DL signals such as a synchronization signal, a cell-specific reference signal, or a Positioning Reference Signal. It would be appreciated that the PRS discussed in embodiments of the present disclosure may represent any signal that can be used to make the OTDOA measurement at the UE 130. The UE 130 may send a PRS measurement report including the measured RSTDs (OTDOAs) to a location server (LS) 120.

Once the LS 120 receives the PRS measurement report from the UE 130, it may convert RSTD into a distance difference between a distance from the UE 130 to the neighbor BS 110B or 110C and a distance from the UE 130 to the reference BS 110A based on the known speed of light. As the LS 120 knows positions of the BSs 110 (or physical antennae of the BSs), it may calculate a hyperbola from a distance difference between the neighbor BS and the reference BS, and an intersecting point of two or more such hyperbolas corresponds to an estimated position of the UE 130. The LS 120 may be implemented as a physical or logical entity to manage positioning of UEs connected to the network 100. The BSs 110, which provide access for the UE 130 to the network 100, are also referred to as "RAN". In some embodiments, the LS 120 may be implemented inside the RAN as a local location management component (LMC). In some embodiments, the LS 120 may be implemented as a network function such as a location management function (LMF) within core network (CN). The RAN may be connected to the CN through so called backhaul connections.

Figure 2:
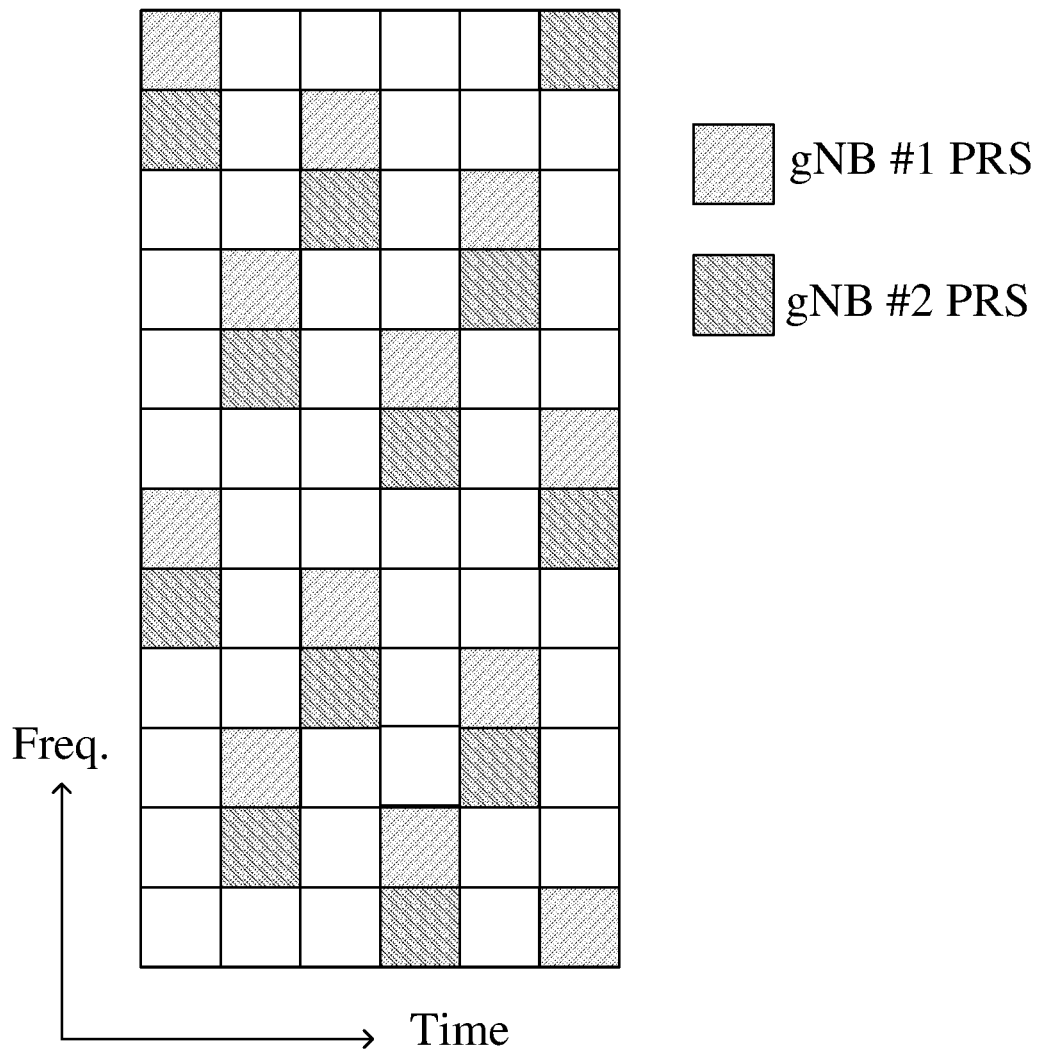
FIG. 2 shows a schematic diagram illustrating resource mapping of positioning reference signals in a comb structure.

The DL PRS may be transmitted using the OFDM scheme. FIG. 2 illustrates an example pattern of the PRSs mapping to resource elements (REs) which respectively comprise an OFDM symbol in the time domain and a subcarrier in the frequency domain. Referring to FIG. 2, the PRSs for BSs for example gNB #1 and gNB #2 are mapped to REs in a comb structure with different comb offsets being allocated to different BSs in order to orthogonalize the signals in the frequency domain. The comb size may be selected by configuration from a pre-defined set for example {2, 4, 6, 12}. The PRS for respective gNBs may be mapped in a diagonal pattern with shifts in frequency and time. A UE may apply a single FFT window for at least one OFDM symbol in order to measure the PRSs from multiple gNBs. For the sake of simplicity and clarity, FIG. 2 shows an example case of a comb size 6 and 2 gNBs.

Figure 3:
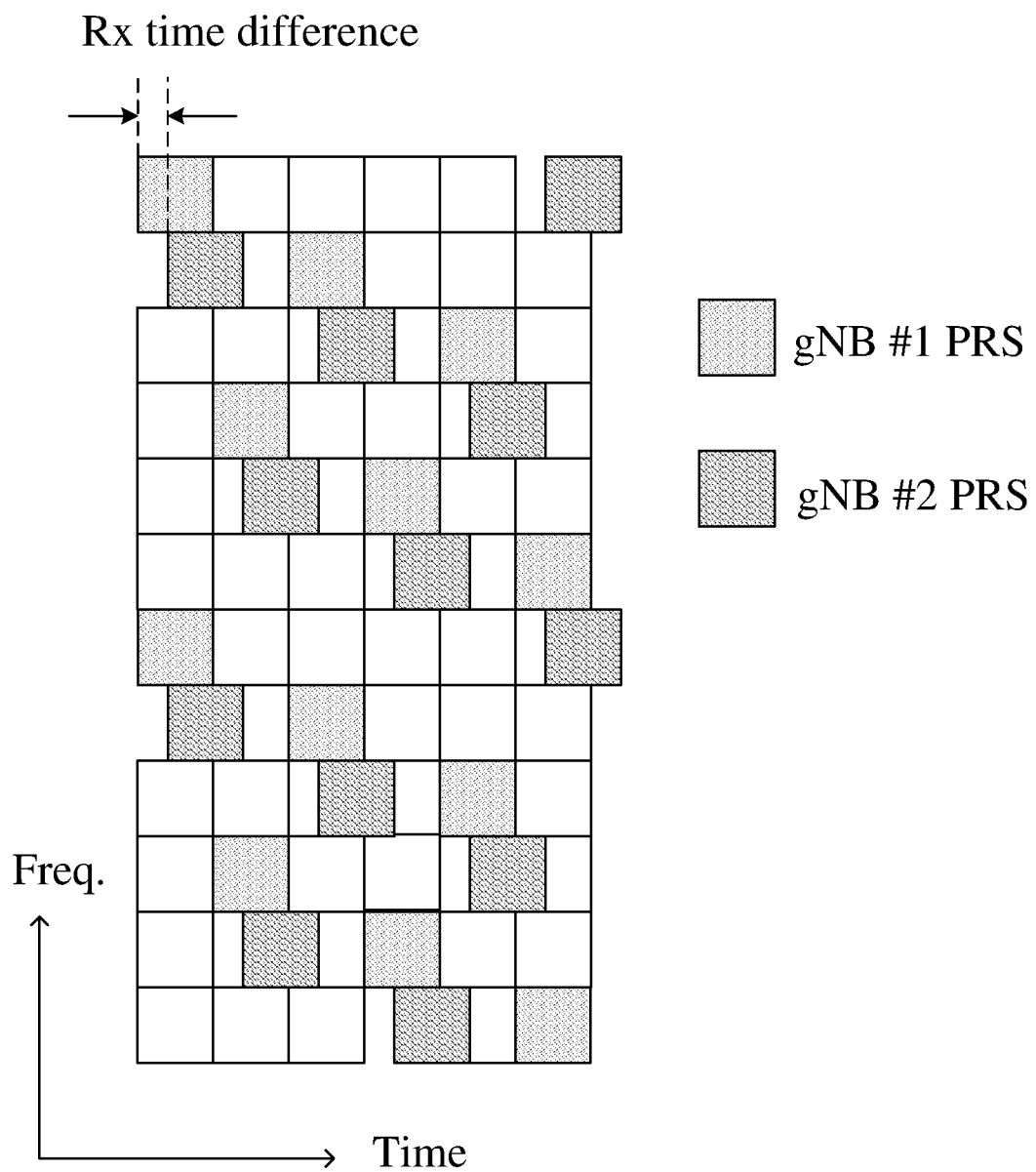
FIG. 3 shows a schematic diagram illustrating reception of the positioning reference signals from UE point of view.

FIG. 3 shows an example of PRS reception from UE point of view, and the PRSs are transmitted from gNB #1 and gNB #2 using resources shown in FIG. 2. Referring to FIG. 3, due to a difference between a distance from the gNB #1 to the UE and a distance from the gNB #2 to the UE, the UE may receive the PRS from the gNB #1 before it receives the PRS from the gNB #2, causing a receiving time difference between the PRS from the gNB #1 and the PRS from the gNB #2. For example, a distance difference of 30 m will cause a receiving time difference of about 100 ns. As discussed above, the receiving time difference is measured at the UE for position estimation.

The wireless communication technology is expected to advance toward higher frequencies in order to provide larger bandwidth and higher data rate. Higher carrier frequencies are also favorable for network-based positioning because larger bandwidths are available for signals, which leads to better achievable timing estimation and in turn higher possible positioning accuracy. As the carrier frequencies increase, the subcarrier spacing (SCS) may also increase, and the symbol length and cyclic prefix (CP) duration may become shorter. When this occurs, the symbol alignment of the PRSs from multiple BSs may break down from the UE point of view due to the fact that the receiving time difference between the PRSs from different gNBs is no longer much smaller than the symbol length. For example, when the SCS increases from current 240 kHz to 960 kHz or higher, the symbol length becomes about 1.04 µs or lower and the CP duration becomes about 0.07 µs or lower. In such a case, a receiving time difference of 100 ns is significant as it is larger than the CP. Therefore, as shown in FIG. 3, additional interference will be caused to neighbor symbols due to the PRS being received from different gNBs on the current symbol.

Figure 4:
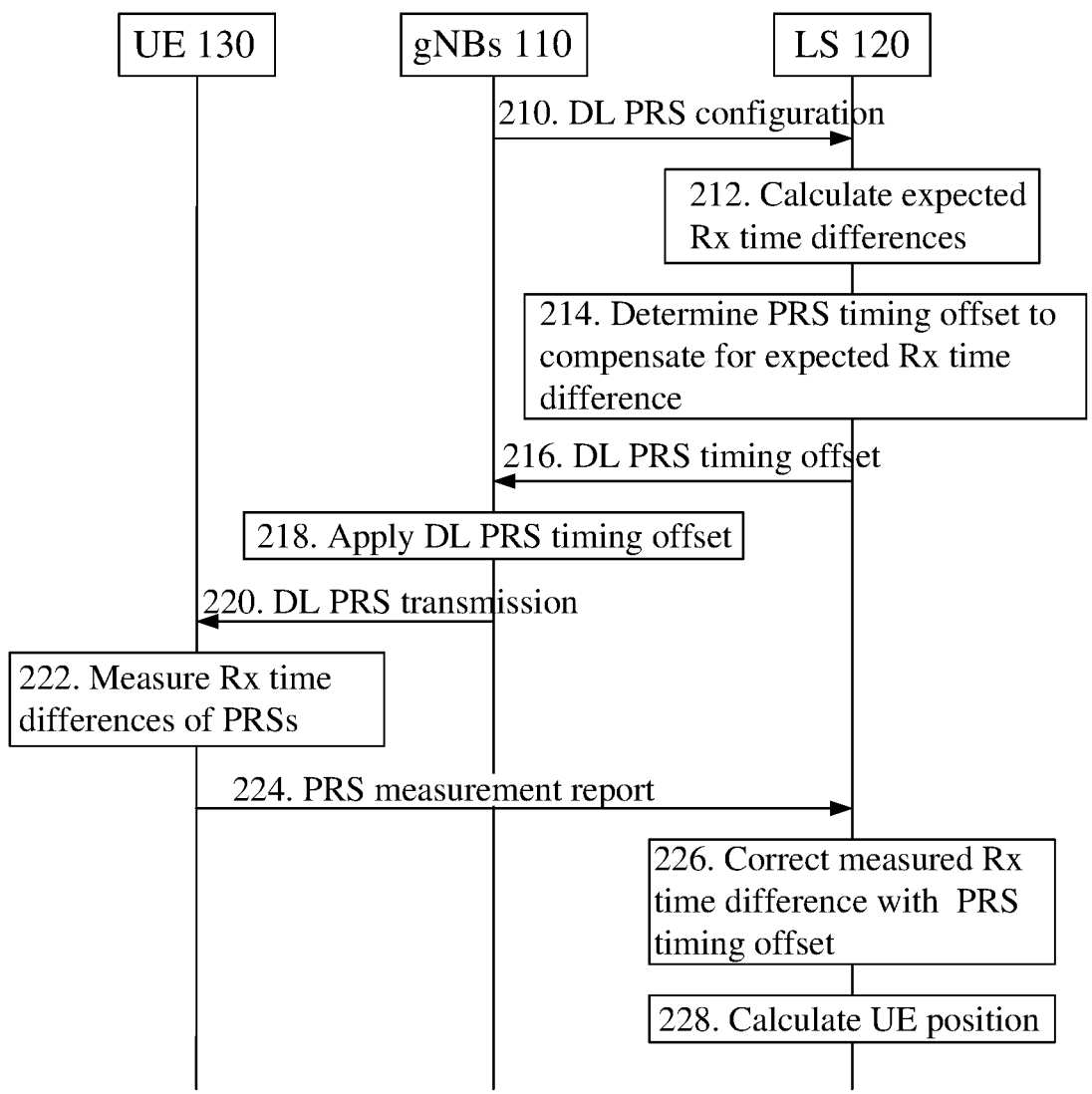
FIG. 4 shows an exemplary signaling flow illustrating position estimation of user equipment according to an embodiment of the present disclosure.

FIG. 4 shows an exemplary signaling flow 200 illustrating position estimation of user equipment according to an embodiment of the present disclosure. The signaling flow 200 shown in FIG. 4 may be implemented in the communication network 100 shown in FIG. 1 to reduce or eliminate misalignment of PRS symbols from multiple BSs even when the carrier frequencies are higher than 52.6 GHz. It would be appreciated that the signaling flow 200 of FIG. 4 may also be applicable to communication networks where the carrier frequencies are lower than 52.6 GHz.

Referring to FIG. 4, the signaling flow 200 may initially comprise Operation 210 of the LS 120 receiving DL PRS configurations from the BSs 110. The DL PRS configuration may be provided by transmitting a positioning protocol message from the respective BSs 110 to the LS 120, and it may include for example PRS configuration index, number of subframes in at least one PRS positioning occasion, CP length, PRS bandwidth, PRS carrier frequency, PRS code sequence, etc. Although not shown in FIG. 4, the UE 130 may also report its positioning capabilities to the LS 120 by a positioning protocol message. For example, the positioning capabilities may include OTDOA mode supported at the UE 130, frequency bands for which the UE 130 supports RSTD measurements, and support for inter-frequency RSTD measurements.

In Operation 212, the LS 120 may calculate expected receiving time differences between the respective neighbor BSs 110B, 110C and the reference BS 110A. To calculate the expected receiving time differences, the LS 120 needs to know a rough apriori location of the UE 130. In some embodiments, the LS 120 may roughly estimate the position of the UE 130 based on for example a historic position, serving cell ID, enhanced cell ID, Reference Signal Receiving Power (RSRP), timing advance (TA), and/or DL-AoD of a communication beam for the UE 130. Based on the apriori position of the UE 130, the LS 120 may also select neighbor BS candidates for the UE 130, for example neighbor BSs 110B, 110C around the apriori position, to obtain good measurement geometry. With the apriori UE position and the BS positions, the LS 120 may calculate expected receiving time differences between respective expected times for the UE 130 to receive the PRSs from the neighbor gNBs 110B, 110C respectively and an expected time for the UE 130 to receive the PRS from the reference gNB 110A. In some embodiments, the expected receiving time difference may be calculated as expected RSTD. The expected RSTD predicts an RSTD value that the UE is expected to measure between a neighbor BS and a reference BS. It takes into account an expected propagation time difference as well as any transmit time difference of PRS positioning occasions between the neighbor BS and the reference BS. The expected RSTD may have an uncertainty due to uncertain position of the UE within the serving cell operated by the reference BS, and the expected RSTD uncertainty may have a value in proportion with a maximum cell radius of the serving cell. Assuming the expected RSTD for the neighbor BS is $t_1$ and the expected RSTD uncertainty is $\Delta t$, the UE 130 is expected to receive the PRS from the neighbor BS within a time period $[t_1-\Delta t, t_1+\Delta t]$ after receiving the PRS from the reference BS. That is, the maximum expected RSTD between the neighbor BS and the reference BS is a sum of the expected RSTD and the expected RSTD uncertainly, i.e., $t_1+\Delta t$. In some embodiments, the expected receiving time difference may be calculated in Operation 212 as the maximum expected RSTD.

At Operation 214, the LS 120 may determine at least one PRS timing offset to at least partially compensate for the expected receiving time difference of at least one of the neighbor BSs 110B, 110C. In some embodiments, for example, if the neighbor BS 110B has an expected receiving time difference larger than a threshold for example the CP duration, which means that the PRS symbol would likely cause interference to a neighbor symbol, then a PRS timing offset may be calculated for the neighbor BS 110B to compensate for the expected receiving time difference of the neighbor BS 110B to be within the threshold for example the CP duration. On the other hand, if the neighbor BS 110C has an expected receiving time difference smaller than the threshold, it does not need to be compensated and the PRS timing offset may not be calculated for the neighbor BS 110C. In some embodiments, alternatively, the LS 120 may calculate a PRS timing offset for neighbor BSs to compensate for the expected receiving time differences of the neighbor BSs, regardless if the expected receiving time differences of the neighbor BSs exceed a threshold or not.

In some embodiments, the PRS timing offset determined at Operation 214 may have a value such that it can compensate for the expected receiving time difference of the corresponding neighbor BS at least to be within the threshold for example the CP duration. In this regard, the PRS timing offset may have a value $T_e-T_{th}$ where $T_e$ is the expected receiving time difference, $T_{th}$ is the threshold for example the CP duration, and $T_e$ is larger than $T_{th}$. In some embodiments, the PRS timing offset may have a value $T_e$ such that the expected receiving time difference may be fully compensated. In some embodiments, the PRS timing offset may have a value in a range of $[T_e-T_{th}, T_e]$.

In some embodiment, in order to improve efficiency and reduce signaling overhead, the LS 120 may determine a common PRS timing offset for a group of UEs in a zone close to each other. The LS 120 may group the UEs based on rough positioning estimation of the UEs as discussed above. For example, UEs in a cell or cell portion may be grouped together, and the UEs in a group may have a maximum variation of expected receiving time difference less than a threshold for example the CP duration. That is to say, the UEs in a group are geometrically close to each other and have similar expected receiving time differences. In such a case, the LS 120 may determine a common PRS timing offset for a neighbor BS in association with the group of UEs to compensate for a maximum or average value of the expected receiving time differences of the group of UEs. As will be appreciated, the LS 120 may determine different common PRS timing offsets for different groups of UEs. The LS 120 may also configure a common positioning occasion for the group of UEs. A positioning occasion may include a predefined number of consecutive or inconsecutive subframes, and the LS 120 may configure different subframes in the positioning occasion for different UE groups.

Then in Operation 216, the LS 120 may send the determined at least one PRS timing offset to a corresponding neighbor BS, for example the neighbor BS 110B or 110C. The neighbor BS may apply the PRS timing offset to adjust transmit timing of the PRS in Operation 218. For example, the neighbor BS may adjust the transmit timing of the PRS forward by the PRS timing offset. In some embodiments, as discussed above, the neighbor BS may receive and apply multiple PRS timing offsets for different subframes in a positioning occasion respectively.

Then in Operation 220, the BSs 110 may transmit PRS signals according to the PRS transmit timing. As discussed above in Operation 218, the PRS transmit timing of the neighbor BSs 110B, 110C may have been adjusted, while the PRS transmit timing of the reference BS 110A may not be adjusted. In some embodiments where a plurality of PRS timing offsets are applied for different subframes, the neighbor BSs 110B, 110C will transmit the PRS signals at different timing in respective subframes. In some embodiments, the BSs 110 may further apply a guard period for example a guard symbol(s) before and/or after transmitting the PRS in order to avoid interference to an adjacent symbol due to timing shift of the PRS symbol. It would be appreciated that the reference BS 110A may transmit the PRS without adjusting its PRS transmit timing.

In Operation 222, the UE 130 may measure receiving time differences of the PRSs received from the BSs 110. As the PRS transmit timing of one or more neighbor BSs may have been adjusted in the foregoing operations, the measured receiving time differences of the PRSs received from the BSs 110 would be similar to each other, at least no more than the threshold for example the CP duration. From the UE point of view, the PRS symbols received from multiple BSs are aligned to each other, as shown in FIG. 2, which ensures orthogonality of the PRS symbols in the time domain. As such, the PRS symbol would not cause interference to adjacent symbols due to a large receiving time difference, the UE 130 may apply a single FFT window for at least one PRS symbol in receiving the PRSs, and the positioning accuracy can be improved.

In Operation 224, the UE 130 may send a PRS measurement report including the measured receiving time differences between the respective neighbor BSs and the reference BS to the LS 120. The PRS measurement report may be sent by a positioning protocol message for example a Provide Location Information message to the LS 120. In addition to the measured receiving time differences, the PRS measurement report may further include for example time stamp of the measurement, reference cell identity, neighbor cell identity, measurement quality, etc.

As the measured receiving time differences are obtained after adjusting transmit timing of the PRSs, they cannot reflect distance differences between the respective neighbor BSs 110B, 110C and the reference BS 110A to the UE 130. In Operation 226, the LS 120 may correct at least one of the measured receiving time difference according to the PRS timing offset determined in Operation 214. As the PRS timing offset is determined at the LS 120 for at least one of the neighbor BSs, the LS 120 knows which measured receiving time difference(s) needs to be corrected. For example, if the PRS transmit timing of a neighbor BS is adjusted forward by a PRS timing offset, then the LS 120 increases the measured receiving time difference between the neighbor BS and a reference BS by an amount of the PRS timing offset in Operation 226. Thus, the corrected receiving time differences can reflect actual distance differences between the respective neighbor BSs and the reference BS.

In Operation 228, the LS 120 may calculate position of the UE 130 using the corrected receiving time differences and locations of the BSs 110. As the locations of the BSs 110 is fixed, the receiving time difference can be converted into a hyperbola on which points have a distance difference from the neighbor BS than from the reference BS corresponding to the receiving time difference, and intersection position of two or more hyperbolas may be calculated as the position of the UE 130.

In the above signaling flow 200, as the transmit timing of the PRS signal is adjusted at the BSs, the PRS symbols received from the BSs are aligned to each other from the UE point of view. Thus, the UE can use a single FFT window for receiving of the PRS symbols from the BSs, and interference to adjacent symbols due to misalignment of the PRS symbols from different BSs may be reduced or avoided. As a result, accuracy of the OTDOA positioning is improved. It would be appreciated that OTDOA is an example of positioning techniques that embodiments disclosed herein may be applied to, and the principle of the present disclosure may also be applied to other positioning techniques such as multi-RTT, DL-AoD, or future positioning techniques.

Figure 5:
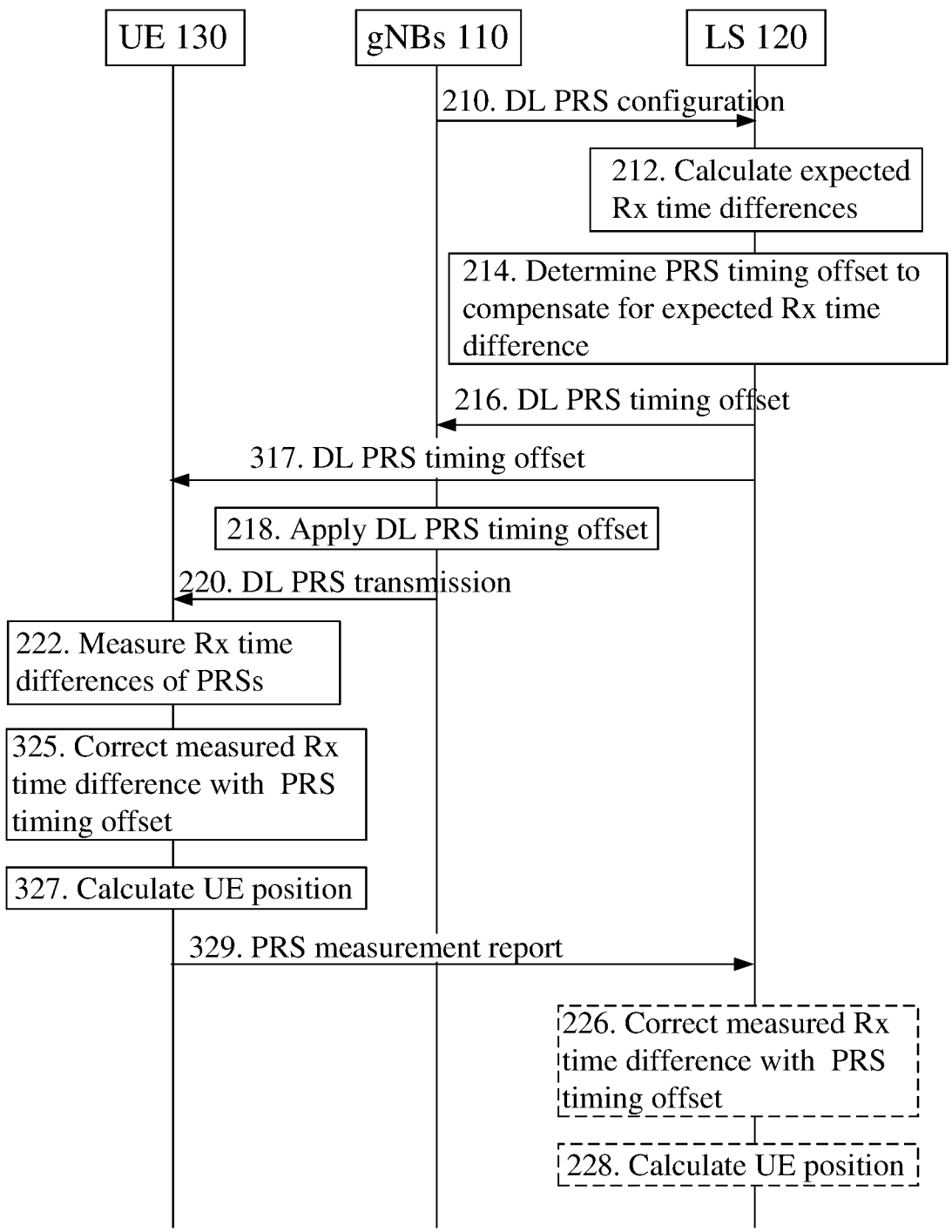
FIG. 5 shows an exemplary signaling flow illustrating position estimation of user equipment according to another embodiment of the present disclosure.

FIG. 5 shows a signaling flow 300 illustrating position estimation of user equipment according to another embodiment of the present disclosure. The signaling flow 300 differs from the signaling flow 200 at least in that calculation of the UE position may also be performed at the UE side. Operations in the signaling flow 300 the substantially same as those in the signaling flow 200 are denoted by the same reference signs and a repetitive description thereof will be omitted here. Hereinafter difference of the signaling flow 300 than the signaling flow 200 will be discussed in detail.

Referring to FIG. 5, In Operation 317, the DL PRS timing offset(s) determined in Operation 216 may also be sent from the LS 120 to the UE 130. The PRS timing offset may be sent by a positioning protocol message for example a Provide Assistance Data message to the UE 130. In addition to the PRS timing offset, the Provide Assistance Data message may include assistance data for the UE 130, including for example reference cell information, neighbor cell information, and frequency layer information if inter-frequency RSTD measurement is supported.

In Operation 325, the UE 130 may correct one or more of the measured receiving time differences according to the PRS timing offset(s) received in Operation 317. Similar to Operation 226 in the signaling flow 200, the UE 130 knows which receiving time difference needs to be corrected based on the received PRS timing offset(s) for the neighbor BS(s). Correction of the one or more of the measured receiving time differences may be carried out in a similar way as in Operation 226, and a repetitive description thereof is omitted here.

Then in Operation 327, the UE 130 may calculate a position based on the corrected receiving time differences and locations of the reference and neighbor BSs 110A, 110B, 110C. The position of the UE 130 may be calculated in a similar way as in Operation 228, and a repetitive description thereof is omitted here.

In Operation 329, the UE 130 may send a PRS measurement report to the LS 120. In some embodiments, the PRS measurement report may include the measured receiving time differences, like the PRS measurement report sent in Operation 224 of the signaling flow 200. In such a case, the LS 120 needs to correct the measured receiving time differences based on the PRS timing offset(s) in Operation 226 before it calculates the position of the UE 130 in Operation 228. In some embodiments, the PRS measurement report sent in Operation 329 may include the corrected receiving time differences. In such a case, the LS 120 does not need to correct the receiving time differences in Operation 226, but directly calculates the position of the UE 130 using the corrected receiving time differences in Operation 228. In some embodiments, the PRS measurement report sent in Operation 329 may include the position of the UE 130 calculated in Operation 327. In such a case, the LS 120 does not need to correct the receiving time differences in Operation 226 or calculate the position of the UE 130 in Operation 228.

In the signaling flow 300, the LS 120 sends the PRS timing offset(s) not only to the corresponding neighbor BS(s) but also to the UE 130. Then, the UE 130 can correct the measured receiving time difference based on the PRS timing offset(s) and calculate its own position based on the corrected receiving time differences. It may relief calculation burden on the LS 120 and the UE 130 may obtain its own position more quickly than receiving it from the LS 120.

Figure 6:
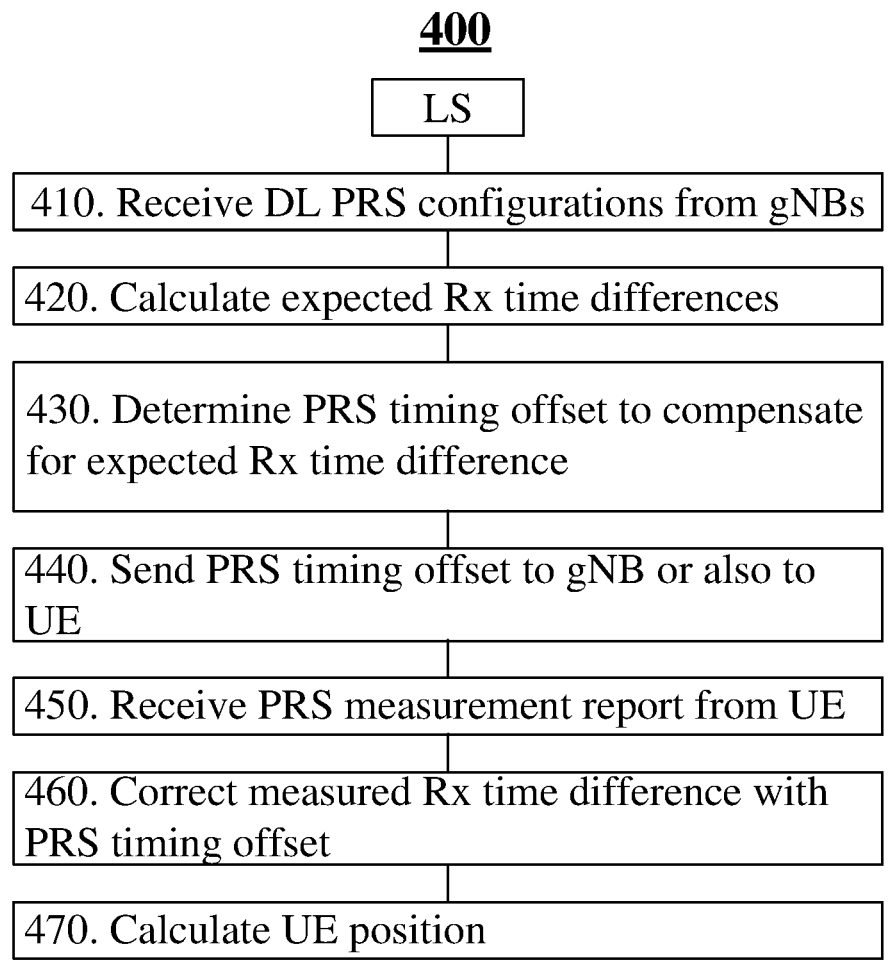
FIG. 6 shows a flow chart illustrating a method for positioning user equipment according to an embodiment of the present disclosure.

FIG. 6 illustrates a flow chart of an example method 400 for positioning a UE in accordance with some example embodiments. The method 400 may be performed by a location server for example the LS 120 in communication with a plurality of base stations for example the BSs 110 and one or more user equipment for example the UE 130. For a better understanding, the below description of the method 400 may be read with reference to the above description relating to FIGS. 1-5.

Referring to FIG. 6, the example method 400 may include a step 410 of receiving DL PRS configurations from the BSs 110, as at Operation 210 in FIGS. 4-5. In some embodiments, the DL PRS configuration received from a BS may include for example PRS configuration index, number of subframes in at least one PRS positioning occasion, CP length, PRS bandwidth, PRS carrier frequency, PRS code sequence, etc.

At a step 420, the LS 120 may calculate expected receiving time differences between respective expected times for the UE 130 to receive PRSs from the neighbor BSs 110B, 110C respectively and an expected time for the UE 130 to receive a PRS from the reference BS 110A, as at Operation 212 in FIGS. 4-5. The LS 120 may calculate the expected receiving time differences according to rough positioning estimation of the UE 130 based on for example historic position or other information of the UE 130 such as serving cell ID, enhanced cell ID, RSRP, TA and/or DL-AoD of a communication beam for the UE 130. In some embodiments, the expected receiving time difference between a neighbor BS and a reference BS may be calculated as expected RSTD for the neighbor BS or a sum of the expected RSTD and a corresponding expected RSTD uncertainty.

At a step 430, the LS 120 may determine a PRS timing offset(s) to at least partially compensate for the expected receiving time difference of at least one of the plurality of neighbor BSs, as at Operation 214 in FIGS. 4-5. In some embodiments, if the expected receiving time difference of a neighbor BS exceeds a threshold which may be determined based on for example the CP length, the LS 120 may determine a PRS timing offset for the neighbor BS to compensate for its expected receiving time difference. On the other hand, if the expected receiving time difference of the neighbor BS is within the threshold, the LS 120 may not determine a PRS timing offset for the neighbor BS. In some embodiments, the LS 120 may determine a PRS timing offset for respective neighbor BSs to compensate for their expected receiving time differences, no matter if the expected receiving time differences of the neighbor BSs exceed the threshold or not. In some embodiments, the PRS timing offset may have a value to fully or at least partially compensate for the expected receiving time difference of the neighbor BS to be within the threshold. The value of the PRS timing offset may range from $T_e-T_{th}$ to $T_e$ where $T_e$ is the expected receiving time difference and $T_{th}$ is the threshold which may be equal to or smaller than the CP length.

In some embodiments, before determining the PRS timing offset(s) at the step 430, the LS 120 may group a plurality of UEs based on a rough position estimation of the UEs. For example, UEs in a cell or cell portion may be grouped together so that the UEs in one UE group have similar expected receiving time differences. Then at the step 430, the LS 120 may determine a common PRS timing offset for the group of UEs to compensate for a maximum or average value of the expected receiving time differences of a neighbor BS in association with the group of UEs. Further, the LS 120 may configure a common positioning occasion (or exactly, a common subframe in a positioning occasion) for the group of UEs. It would be appreciated that different groups of UEs may have different common PRS timing offsets and be configured with different positioning occasions or different subframes in a positioning occasion.

At a step 440, the LS 120 may send the PRS timing offset(s) to a corresponding neighbor BS(s) for example the neighbor BS 110B and/or 110C, as at Operation 216 in FIGS. 4-5. It should be noted that the reference BS 110A does not need the PRS timing offset parameter as the PRS transmit timing thereof may not be adjusted. In some embodiments, the LS 120 may also send in the step 440 the PRS timing offset(s) to the UE 130, as at Operation 317 in FIG. 5. In such a case, information of the neighbor BS(s) associated with the PRS timing offset(s) is also sent to the UE 130 so that the UE 130 knows which neighbor BS(s) the PRS timing offset(s) is applied to.

At a step 450, the LS 120 may receive from the UE 130 receiving time differences of the PRSs measured for the neighbor BSs 110B, 110C with respect to the reference BS 110A, as at Operation 224 in FIG. 4 or Operation 329 in FIG. 5. In some embodiments, the PRS measurement report may include the receiving time differences as measured at the UE 130. In some embodiments where the LS 120 has sent the PRS timing offset(s) to the UE 130, the PRS measurement report may include the receiving time differences one or more of which have been corrected based on the PRS timing offset(s) at the UE 130 (as at Operation 325 in FIG. 5). In some embodiments, the PRS measurement report may further include the position of the UE 130 calculated at the UE 130 based on the corrected receiving time differences (as at Operation 327 in FIG. 5).

Optionally, the method 400 may further include a step 460 of correcting the measured receiving time differences received from the UE 130 according to the PRS timing offset(s), as at Operation 226 in FIGS. 4-5. As the PRS transmit timing was adjusted according to the PRS timing offset at the neighbor BS in order to make the PRS symbol from the neighbor BS align with the PRS symbol from the reference BS at the UE point of view (as at Operation 218 in FIGS. 4-5), the measured receiving time difference of the PRS between the neighbor BS and the reference BS needs to be corrected according to the PRS timing offset so as to reflect an actual distance difference between the neighbor BS and the reference BS to the UE. In some embodiments where the PRS measurement report includes the receiving time differences that have been corrected at the UE 130, the step 460 may be omitted.

Then at a step 470, the LS 120 may optionally calculate the position of the UE 130 based on the corrected receiving time differences and locations of the BSs 110, as at Operation 228 in FIGS. 4-5. In some embodiments where the UE 130 has calculated its own position (as at Operation 327 in FIG. 5) and send its position to the LS 120 in the PRS measurement report (as at Operation 329 in FIG. 5), the step 470 may be omitted.

Figure 7:
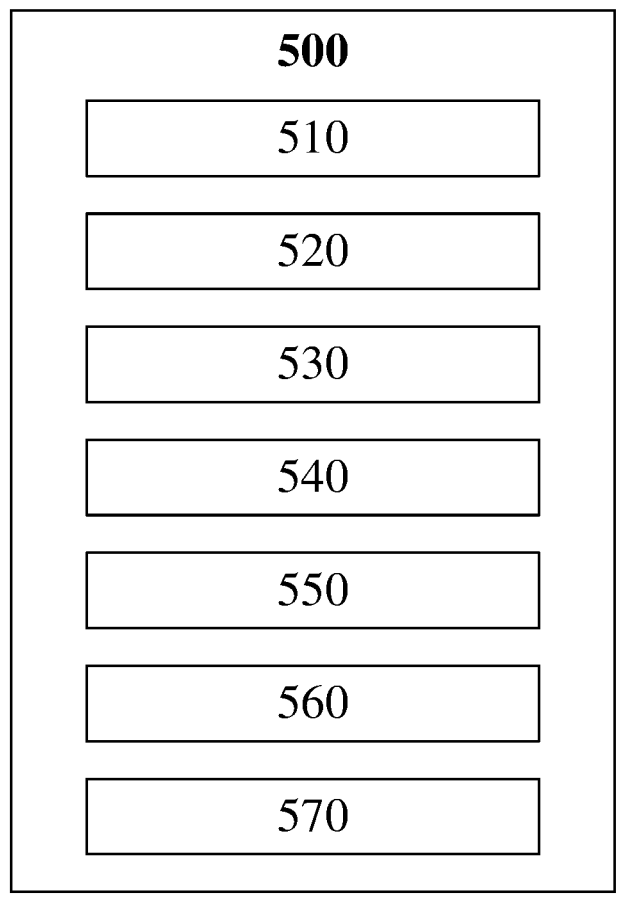
FIG. 7 shows a block diagram illustrating an apparatus for positioning user equipment according to an embodiment of the present disclosure.

FIG. 7 shows a block diagram illustrating an apparatus 500 for positioning user equipment according to some embodiments. The apparatus 500 may be implemented at a location server for example the LS 120 to perform the method 400 shown in FIG. 6. Referring to FIG. 7, the apparatus 500 may include a first means (or module) 510 configured to receive DL PRS configurations from a plurality of BSs including a reference BS and a plurality of neighbor BSs, a second means 520 configured to calculate expected receiving time differences between the respective neighbor BSs and the reference BS, a third means 530 configured to determine a PRS timing offset for at least one neighbor BS to compensate for the expected receiving time difference of the at least one neighbor BS with respect to the reference BS, a fourth means 540 configured to send the PRS timing offset to the at least one neighbor BS or also to the UE, a fifth means 550 configured to receive PRS measurement report from the UE, a sixth means 560 configured to correct receiving time differences measured at the UE based on the PRS timing offset, and a seventh means 570 configured to calculate position of the UE based on the corrected receiving time differences and locations of the BSs. Function details of the blocks 510-570 may refer to the method 400 discussed above with reference to FIG. 6 and a repetitive description thereof is omitted here.

Figure 8:
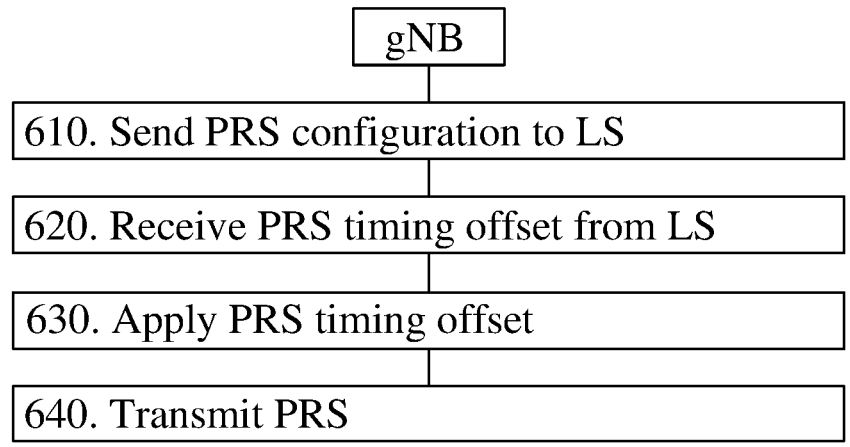
FIG. 8 shows a flow chart illustrating a method for positioning user equipment according to an embodiment of the present disclosure.

FIG. 8 illustrates a flow chart of an example method 600 for positioning a UE in accordance with some example embodiments. The method 600 may be performed by a network device for example the neighbor BSs 110B, 110C in communication with a location server for example the LS 120. For a better understanding, the below description of the method 600 may be read with reference to the above description relating to FIGS. 1-5.

Referring to FIG. 8, the example method 600 may include a step 610 of sending DL PRS configuration to the LS 120, as at Operation 210 in FIGS. 4-5, and a step 620 of receiving at least one PRS timing offset from the LS 120, as at Operation 216 in FIGS. 4-5. In some embodiments, the neighbor BS 110B or 110C may receive one PRS timing offset for all or some subframes in a positioning occasion. In some embodiments, the neighbor BS 110B or 110C may receive multiple PRS timing offsets for multiple subframes in the positioning occasion respectively.

Then, the neighbor BS 110B or 110C may apply the received PRS timing offset to adjust PRS transmit timing thereof at a step 630, and transmit the PRS signals according to the adjusted PRS transmit timing at a step 640. In some embodiments where multiple PRS timing offsets are applied to multiple subframes in a positioning occasion respectively, the neighbor BS may repeatedly transmit the PRS signals in respective subframes using different PRS timing offsets. It is beneficial for UEs or UE groups at different zones to receive PRS symbols aligned to PRS symbols received from a reference BS. In some embodiments, the neighbor BS may further apply a guard period before and/or after transmitting the PRS.

Figure 9:
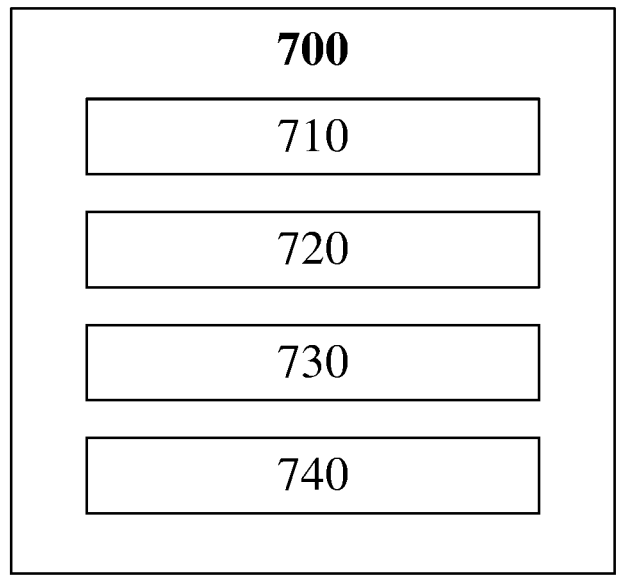
FIG. 9 shows a block diagram illustrating an apparatus for positioning user equipment according to an embodiment of the present disclosure.

FIG. 9 shows a block diagram illustrating an apparatus 700 for positioning user equipment according to some embodiments. The apparatus 700 may be implemented at a network device for example the neighbor BS 110B and/or 110C to perform the method 600 shown in FIG. 8. Referring to FIG. 9, the apparatus 700 may include a first means (or module) 710 configured to send PRS configuration to a location server for example the LS 120, a second means 720 configured to receive at least one PRS timing offset from the LS 120, a third means 730 configured to apply the PRS timing offset to adjust PRS transmit timing, and a fourth means 740 configured to transmit the PRS signals according to the adjusted PRS transmit timing. Function details of the blocks 710-740 may refer to the method 600 discussed above with reference to FIG. 8 and a repetitive description thereof is omitted here.

Figure 10:
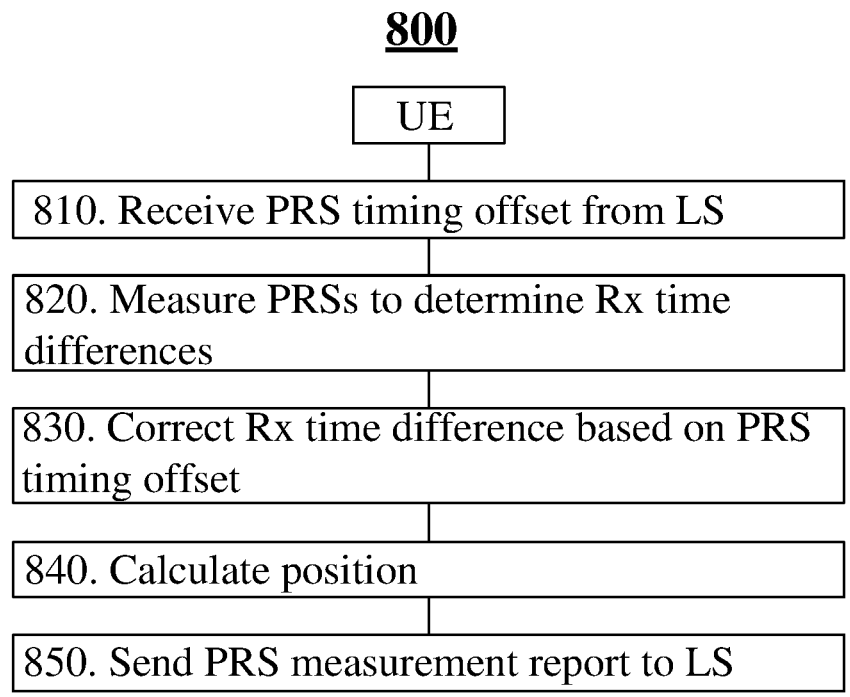
FIG. 10 shows a flow chart illustrating a method for positioning user equipment according to an embodiment of the present disclosure.

FIG. 10 shows a flow chart illustrating a method 800 for positioning user equipment according to some embodiments. The method 800 may be performed by a terminal device for example the UE 130. For a better understanding, the below description of the method 800 may be read with reference to the above description relating to FIGS. 1-5.

Referring to FIG. 10, the example method 800 may include a step 810 of receiving a PRS timing offset(s) for at least one neighbor BS from the LS 120, as at Operation 317 in FIG. 5. The UE 130 may also receive reference cell information and neighbor cell information from the LS 120.

At a step 820, the UE 130 may receive PRS signals from a plurality of BSs including for example the reference BS 110A and the neighbor BSs 110B, 110C, and measure receiving time differences of the PRS signals received from the respective neighbor BSs 110B, 110C with respect to the reference BS 110A, as at Operations 220, 222 in FIG. 5. It would be understood that the transmit timing of the PRS signals received from the neighbor BSs 110B, 110C may have been adjusted according to the PRS timing offset.

At a step 830, the UE 130 may correct the measured receiving time differences at least based on the PRS timing offset(s) received from the LS 120, as at Operation 325 in FIG. 5. The correction can compensate for PRS transmit timing adjustment at the neighbor BS so that the corrected receiving time difference can reflect an actual distance difference between the neighbor BS and the reference BS to the UE 130.

Then, the UE 130 may calculate its own position based on the corrected receiving time differences and locations of the reference and neighbor BSs at a step 840, as at Operation 327 in FIG. 5, and send a PRS measurement report to the LS 120 at a step 850, as at Operation 329 in FIG. 5. The PRS measurement report may include for example the measured receiving time differences, the corrected receiving time differences, and/or the calculated position of the UE 130. If the UE 130 sends its position coordinates to the LS 120, the LS 120 does not need to correct the measured receiving time differences and calculate the position of the UE 130. In this regard, the method 800 can relief calculation burden on the LS 120.

In some embodiments, the method 800 may further include a step of applying a guard period for example a guard symbol(s) before and/or after receiving of the PRS at the UE 130. The guard period may help avoid interference caused due to the PRS transmit timing shift.

Figure 11:
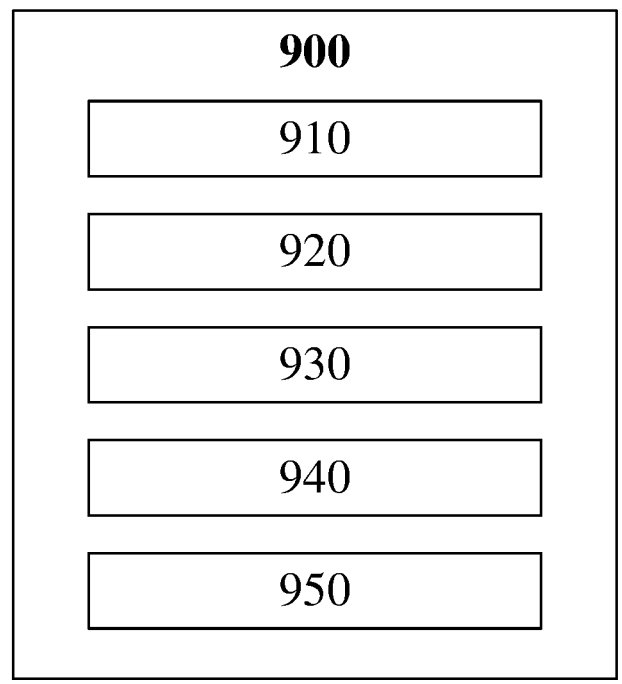
FIG. 11 shows a block diagram illustrating an apparatus for positioning user equipment according to an embodiment of the present disclosure.

FIG. 11 shows a block diagram illustrating an apparatus 900 for positioning user equipment according to some embodiments. The apparatus 900 may be implemented at a terminal device for example the UE 130 to perform the method 800 shown in FIG. 10. Referring to FIG. 11, the apparatus 900 may include a first means (or module) 910 configured to receive a PRS timing offset(s) for at least one neighbor BS for example the neighbor BS 110B, 110C from a location server for example the LS 120, a second means 920 configured to measure receiving time differences of the PRSs received from neighbor BSs than from a reference BS, a third means 930 configured to correct one or more of the measured receiving time differences according to the PRS time offset(s) received from the LS 120, a fourth means 940 configured to calculate position of the UE 130 based on the corrected receiving time differences and locations of the BSs 110, and a fifth means 950 configured to send a PRS measurement report to the LS 120. Function details of the blocks 910-950 may refer to the method 800 discussed above with reference to FIG. 10 and a repetitive description thereof is omitted here.

Figure 12:
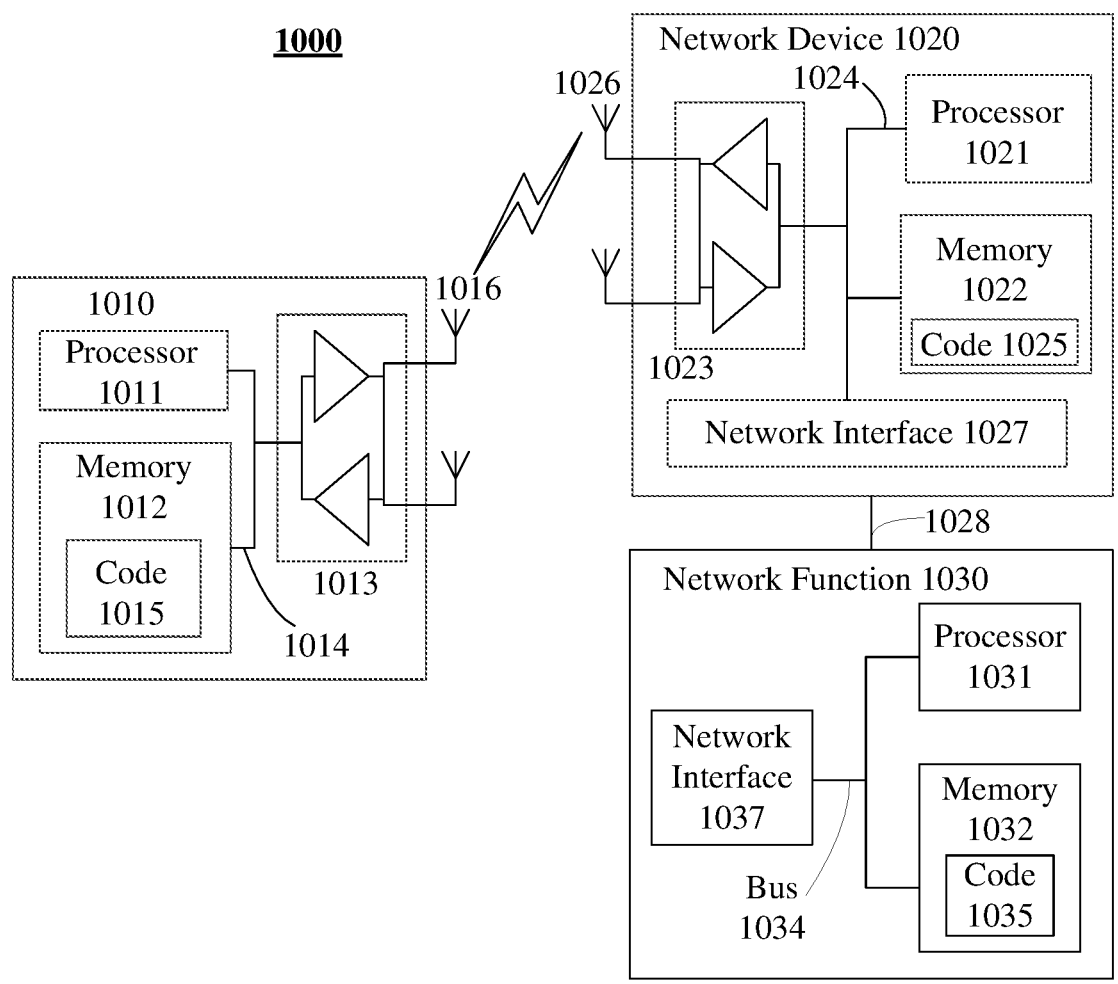
FIG. 12 shows a block diagram illustrating an example communication system in which embodiments of the present disclosure can be implemented.

FIG. 12 illustrates a block diagram of an example communication system 1000 in which embodiments of the present disclosure can be implemented. As shown in FIG. 12, the communication system 1000 may comprise user equipment (UE) 1010 which may be implemented as the UE 130 discussed above, a network device 1020 which may be implemented as the BSs 110 discussed above, and a network function 1030 which may be implemented as the LS 120 discussed above. In some embodiments, alternatively, the LS 120 may be implemented as a component or part in the network device 1020. Although FIG. 10 shows one network device 1020, it would be appreciated that the communication system 1000 may comprise a plurality of network devices 1020 to position or assist positioning of the UE 1010.

Referring to FIG. 12, the UE 1010 may comprise one or more processors 1011, one or more memories 1012 and one or more transceivers 1013 interconnected through one or more buses 1014. The one or more buses 1014 may be address, data, or control buses, and may include any interconnection mechanism such as series of lines on a motherboard or integrated circuit, fiber, optics or other optical communication equipment, and the like. Each of the one or more transceivers 1013 may comprise a receiver and a transmitter, which are connected to one or more antennas 1016. The UE 1010 may wirelessly communicate with the network device 1020 through the one or more antennas 1016. The one or more memories 1012 may include computer program code 1015. The one or more memories 1012 and the computer program code 1015 may be configured to, when executed by the one or more processors 1011, cause the UE 1010 to perform processes and steps relating to the UE 130 as described above.

The network device 1020 may comprise one or more processors 1021, one or more memories 1022, one or more transceivers 1023 and one or more network interfaces 1027 interconnected through one or more buses 1024. The one or more buses 1024 may be address, data, or control buses, and may include any interconnection mechanism such as a series of lines on a motherboard or integrated circuit, fiber, optics or other optical communication equipment, and the like.

Each of the one or more transceivers 1023 may comprise a receiver and a transmitter, which are connected to one or more antennas 1026. The network device 1020 may operate as a BS for the UE 1010 and wirelessly communicate with the UE 1010 through the one or more antennas 1026. The one or more network interfaces 1027 may provide wired or wireless communication links through which the network device 1020 may communicate with other network devices, entities, elements or functions. The one or more memories 1022 may include computer program code 1025. The network device 1020 may communicate with the network function 1030 via backhaul connections 1028. The one or more memories 1022 and the computer program code 1025 may be configured to, when executed by the one or more processors 1021, cause the network device 1020 to perform processes and steps relating to the BSs 110 as described above. In some embodiments, the one or more memories 1022 and the computer program code 1025 may be configured to, when executed by the one or more processors 1021, cause the network device 1020 to perform processes and steps relating to the LS 120 as described above.

The network function 1030 may comprise one or more processors 1031, one or more memories 1032, and one or more network interfaces 1037 interconnected through one or more buses 1034. The one or more buses 1034 may be address, data, or control buses, and may include any interconnection mechanism such as a series of lines on a motherboard or integrated circuit, fiber, optics or other optical communication equipment, and the like. The network function 1030 may operate as a core network function and wired or wirelessly communicate with the BS 1020 through one or more links. The one or more network interfaces 1037 may provide wired or wireless communication links through which the network function 1030 may communicate with other network devices, entities, elements or functions. The one or more memories 1032 may include computer program code 1035. The one or more memories 1032 and the computer program code 1035 may be configured to, when executed by the one or more processors 1031, cause the network device 1030 to perform processes and steps relating to the LS 120 as described above.

The one or more processors 1011, 1021 and 1031 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 1011, 1021 and 1031 may be configured to control other elements of the UE/network device/network element and operate in cooperation with them to implement the procedures discussed above.

The one or more memories 1012, 1022 and 1032 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 1012, 1022 and 1032 may include but not limited to an electric, a magnetic, an optical, an electromagnetic, an infrared, or a semiconductor system, apparatus, or device or any combination of the above.

It would be understood that blocks in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause a device or apparatus to perform the procedures described above. The computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some exemplary embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment.

Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

Abbreviations used in the description and/or in the figures are herewith defined as follows:
AoD Angle of Departure
BS Base Station
BW Bandwidth
CN Core Network
CP Cyclic Prefix
DL Downlink
FFT Fast Fourier Transform
FR Frequency Range
eNB LTE Base Station
gNB NR Base Station
IoT Internet of Things
LMC Location Management Component
LMF Location Management Function
LTE Long Term Evolution
NF Network Function
NR New Radio
OFDM Orthogonal Frequency Division Multiplexing
OTDOA Observed Time Difference Of Arrival
RAN Radio Access Network
RB Resource Block
RE Resource Element
RS Reference Signal
RX Receive
PRS Positioning Reference Signal
RSRP Reference Signal Receiving Power
RSTD Reference Signal Time Difference
SCS Subcarrier Spacing
TOA Time of Arrival
TX Transmit
UE User Equipment
UL Uplink

What is claimed is:

1. A method for positioning a user equipment (UE) comprising:
calculating, at a location server, expected receiving time differences between respective expected times for the UE to receive positioning reference signals (PRSs) from a plurality of neighbor base stations respectively and an expected time for the UE to receive a PRS from a reference base station;
determining, at the location server, a PRS timing offset to at least partially compensate for the expected receiving time difference of at least one of the plurality of neighbor base stations; and
sending, by the location server, the PRS timing offset to the at least one of the plurality of neighbor base stations, wherein the PRS timing offset is determined in a case where the expected receiving time difference of the at least one of the plurality of neighbor base stations exceeds a threshold, and the determined PRS timing offset has a value to compensate for the expected receiving time difference of the at least one of the plurality of neighbor base stations to be within the threshold.

2. The method of claim 1 wherein the threshold is determined based on a cyclic prefix duration.

3. The method of claim 1 further comprising:
receiving, at the location server from the UE, receiving time differences of the PRSs measured for the plurality of neighbor base stations with respect to the reference base station;
correcting, by the location server, the measured receiving time difference of the at least one of the plurality of neighbor base stations according to the PRS timing offset for the at least one of the plurality of neighbor base stations; and
calculating, by the location server, position of the UE based on the receiving time differences and locations of the reference base station and the plurality of neighbor base stations.

4. The method of claim 1 further comprising:
sending, by the location server, the PRS timing offset for the at least one of the plurality of neighbor base stations to the UE.

5. The method of claim 4 further comprising:
receiving, at the location server from the UE, receiving time differences for the plurality of neighbor base stations, the receiving time difference of the at least one of the plurality of neighbor base stations having been corrected according to the PRS timing offset for the at least one of the plurality of neighbor base stations; and
calculating, by the location server, position of the UE based on the receiving time differences and locations of the reference base station and the plurality of neighbor base stations.

6. The method of claim 1 further comprising:
grouping, at the location server, a plurality of UEs based on position estimation of the plurality of UEs,
wherein the location server configures a common positioning occasion for UEs in a UE group, and determines a common PRS timing offset for the at least one of the plurality of neighbor base stations in association with the UEs in the UE group.

7. The method of claim 6 wherein the location server configures different subframes within a positioning occasion for different UE groups and determines different common PRS timing offsets for the different UE groups.

8. A method for positioning a user equipment (UE) comprising:
receiving, at a base station from a location server, at least one positioning reference signal (PRS) timing offset;
applying, at the base station, the at least one PRS timing offset to adjust transmission timing of the PRS; and
transmitting, from the base station, the PRS according to the adjusted transmission timing of the PRS, wherein the at least one PRS timing offset comprises a plurality of PRS timing offsets for a plurality of subframes within a positioning occasion respectively, and transmitting of the PRS is repeated in the plurality of subframes by applying the plurality of PRS timing offsets to the plurality of subframes respectively.

9. The method of claim 8 further comprising:
applying, at the base station, a guard period before and/or after transmitting of the PRS.

10. A network device comprising:
at least one processor; and
at least one memory including computer program code, the at least one memory and the computer program code configured to, with the at least one processor, cause the network device to:

receive from a location server at least one positioning reference signal (PRS) timing offset;

apply the at least one PRS timing offset to adjust transmission timing of the PRS; and transmit the PRS according to the adjusted transmission timing of the PRS, wherein the at least one PRS timing offset comprises a plurality of PRS timing offsets for a plurality of subframes within a positioning occasion respectively, and transmitting of the PRS is repeated in the plurality of subframes by applying the plurality of PRS timing offsets to the plurality of subframes respectively.

11. The network device of claim 10 wherein the at least one memory and the computer program code are further configured to, with the at least one processor, further cause the network device to:

apply a guard period before and/or after transmitting of the PRS.

12. A terminal device comprising:

at least one processor; and at least one memory including computer program code, the at least one memory and the computer program code configured to, with the at least one processor, cause the terminal device to:

receive from a location server a positioning reference signal (PRS) timing offset for at least one of a plurality of neighbor base stations;

measure PRSs received from a plurality of base stations comprising the plurality of neighbor base stations and a reference base station to determine receiving time differences of the PRSs between the respective neighbor base stations and the reference base station; and correct the measured receiving time difference of the at least one of the plurality of neighbor base stations at least based on the PRS timing offset, wherein the PRS timing offset is determined in a case where the expected receiving time difference of the at least one of the plurality of neighbor base stations exceeds a threshold, and the determined PRS timing offset has a value to compensate for the expected receiving time difference of the at least one of the plurality of neighbor base stations to be within the threshold.

13. The terminal device of claim 12 wherein the at least one memory and the computer program code are further configured to, with the at least one processor, further cause the terminal device to:

calculate position of the terminal device based at least on the receiving time differences and locations of the plurality of base stations.

14. The terminal device of claim 13 wherein the at least one memory and the computer program code are further configured to, with the at least one processor, further cause the terminal device to:

send the receiving time differences and/or the calculated position of the terminal device to the location server.

15. The terminal device of claim 12 wherein the at least one memory and the computer program code are further configured to, with the at least one processor, further cause the terminal device to:

apply a guard period before and/or after receiving of the PRS.

* * * * *